United States Patent Office

3,749,698
Patented July 31, 1973

---

3,749,698
TREATMENT OF POLYAMIDE GRANULES WITH FORMIC ACID
Gunter Lehmann, Saarbrucken, Otto Neunhoeffer, Homburg, Saar, and Wilhelm Roselius and Otto Vitzthum, Bremen, Germany, assignors to HAG Aktiengesellschaft, Bremen, Germany
No Drawing. Filed Apr. 30, 1971, Ser. No. 139,192
Claims priority, application Germany, May 5, 1970,
P 20 22 026.2
Int. Cl. C08g 20/38
U.S. Cl. 260—78 S      13 Claims

ABSTRACT OF THE DISCLOSURE

Inactivated polyamide granules are reactivated and exhibit improved absorptivity by treatment with formic acid, such as an aqueous formic acid solution having a concentration in a range about 40–70% by weight formic acid, at a temperature in the range 0–80° C. The formic acid treatment is usually carried out for a period of from about one to eight hours. After treatment resulting polyamide granules are separated such as by filtration and rinsed with water.

---

The priority date of the corresponding German patent application P 20 22 026.2, filed May 5, 1970, is claimed.

This invention relates to a method of processing polyamide granules, for example, for improving the absorptivity of technical polyamide granulate, or for reactivating inactivated polyamide granulate.

It is known from Ullmanns Enzyklopädie de Technischen Chemie, vol. 14 (1963), p. 70, that the uniform polyamides are soluble in various reagents, for example concentrated formic acid.

According to the present invention there is provided a method of processing polyamide granules, comprising treating polyamide granules with a solution of formic acid of a concentration of up to 70% by weight, at a temperature of between 0° C. and 80° C., without completely dissolving the granulated polyamide, then separating the liquid phase from the undissolved polyamide granules.

Formic acid of a concentration of at least approximately 40% by weight, in particular of 55 to 68% by weight, is preferably employed. An aqueous formic acid solution is usually employed, but it is also possible however to employ other solvent inert to formic acid.

The operative temperature is preferably from 10° C. to 60° C., in particular from 25° C. to 50° C. The treatment generally is carried out for a period of from 1 to 8 hours.

The polyamide employed may consist of any product common in the trade, e.g. 6-, 6,6-, 6,10- or 11-polyamide, but may also be a polyamide copolymer such as 6/6,6- or 6/6,6/6,10-polyamide copolymers. 6-polyamide is preferably employed.

The polyamide granulates preferably are of a grain size in the range of from 0.5 to 5 mms.

The separation of the polyamide granulate processed may be performed, e.g. by decanting or filtering, and the polyamide granules may then be freed of residual formic acid by treatment with hot water or hot steam and repeated filtering or decanting. The formic acid separated may be purified by redistillation, an azeotropic mixture of 77.5% HCOOH and 22.5% of $H_2O$ being distilled off at 107° C.

The polyamide granulate may be treated with hot steam prior to the treatment by formic acid.

A considerable improvement in the adsorptivity of the polyamide granules is obtained in a reproducible manner by the process according to the invention. The acid losses are small, since the formic acid may for the most part be recovered. The separation of the process products is simple.

Phenolic substances are preferentially adsorbed by polyamide. Since these tend to take part in condensation reactions, a rapid deactivation of the adsorptivity of the polyamide granules is frequently observed. In the process according to the invention, the adsorbate is not only separated, but the adsorptivity is fully restored in a single operation. The recovery of the adsorbate after separation by formic acid may in most cases be performed by simple distillation of the formic acid. This represents a substantial advance compared to the currently applied technique of alkaline separation of the adsorbate. Acidification must be carried out in alkaline separation, with the result that alkali and acid are lost. Disturbances may occur moreover when carrying out alkaline separation, by the action of atmospheric oxygen. Moreover, alkaline separation does not result in any regenerating effect on the adsorptivity of the polyamide.

The degree of activation achieved by the process according to the invention may be determined by the adsorptivity according to the method of G. Lehmann and others, Journal of Chromatography, vol. 37 (1968), pp. 422–430, under the application of β-naphthol orange (orange II).

The invention will now be further described with reference to the following examples.

EXAMPLE 1

50 kgs. of 6-polyamide granules (grain size 1.0 mm.) were stirred at 25° C. for 6 hours with 150 kgs. of 60% by weight of aqueous formic acid. After the formic acid had been decanted, 300 litres of water was employed for rinsing, and drained off again. Further rinsing was performed with water until a measurable variation of the pH value was no longer observed.

EXAMPLE 2

10 kgs. of 6-polyamide granules (grain size 4.0 mms.), which was situated in a vertically disposed glass tube, was preheated to 60° C. with hot steam. At this temperature, it was reacted for 2 hours with 50 kgs. of aqueous 40% by weight formic acid. After draining the formic acid, the residual formic acid was removed by alternate processing with hot water and hot steam. Vertification was carried out by measuring the pH value of the washing water.

The practice of this invention, as indicated hereinabove, is generally applicable to the treatment of polyamide granules to reactivate the same and/or improve their absorptivity. Although the practice of this invention is particularly suitable for the treatment of 6-polyamide granules, the practice of this invention is also applicable to other polyamide granules, particularly the commercial polyamide material identified in the trade as 6-, 6,6-, 6,10- or 11-polyamide as well as polyamide copolymers such as 6/6,6- or 6/6,6/6,10-polyamide copolymers.

Polyamide materials or resins are horny, whitish, translucent high melting material. Nylon, for example, is a polyamide. Nylon-6,6 and nylon-6,10 are products of the condensation reaction of hexamethylene diamine (6 carbon atoms) with adipic (6 carbon atoms) and with sebacic acid (10 carbon atoms), respectively. Nylon-6 and nylon-11 are obtained by the self condensation of ε-amino caproic acid the ω-amino-undecanoic acid, respectively.

We claim:

1. A method of processing polyamide granules which comprises treating said polyamide granules with a formic acid solution having a concentration in the range 40–70% by weight at a temperature in the range 0–80° C. without completely dissolving said polyamide granules and separating the resulting formic acid solution from the undissolved polyamide granules.

2. A method according to claim 1 wherein the formic acid solution has a concentration of from 55% to 68% by weight.

3. A method according to claim 1, wherein the formic acid solution is an aqueous solution.

4. A method according to claim 1, wherein the temperature is from 10° C. to 60° C.

5. A method according to claim 1, wherein the treatment is carried out for a period of from 1 to 8 hours.

6. A method according to claim 1, wherein the polyamide is a 6-, 6,6-, 6,10-, or 11-polyamide.

7. A method according to claim 1, wherein the polyamide is a polyamide copolymer.

8. A method according to claim 7, wherein the polyamide copolymer is a 6/6,6-, or 6/6,6/6,10-polyamide.

9. A method according to claim 1, wherein the polyamide granules are of a grain size in the range of from 0.5 to 5 mms.

10. A method according to claim 1, wherein the resulting formic acid solution is separated by decanting or filtering.

11. A method according to claim 10, wherein after separation of the resulting formic acid solution the treated granules are further treated by hot water or hot steam and filtration or decantation to remove residual formic acid.

12. A method according to claim 10, wherein the formic acid is recovered from the resulting formic acid solution by redistillation.

13. A method according to claim 1, wherein the polyamide granules are treated with hot steam prior to their treatment with the formic acid.

References Cited

UNITED STATES PATENTS

| | | | |
|---|---|---|---|
| 3,597,351 | 8/1971 | Landenburg et al. | 210—32 |
| 2,388,278 | 11/1945 | Moncrieff et al. | 260—78 S |
| 3,463,763 | 8/1969 | Griffiths | 260—78 S |
| 3,146,107 | 8/1964 | Elder et al. | 99—48 |
| 3,373,145 | 3/1968 | Wagner | 260—78 S |
| 3,053,664 | 9/1962 | Hall et al. | 99—48 |

PATRICK D. GARVIN, Primary Examiner

P. E. KONOPKA, Assistant Examiner

U.S. Cl. X.R.

210—32, 40; 252—413, 414, 426; 260—78 A, 78 L, 627 R